United States Patent [19]

Wilms

[11] 4,142,740
[45] Mar. 6, 1979

[54] QUICK DISCONNECT COUPLER

[75] Inventor: Carl A. Wilms, La Habra, Calif.

[73] Assignee: Ameron, Inc., Monterey Park, Calif.

[21] Appl. No.: 824,037

[22] Filed: Aug. 12, 1977

[51] Int. Cl.² ............................................. F16L 55/00
[52] U.S. Cl. ..................................... 285/18; 285/320;
285/364; 285/420
[58] Field of Search .................. 285/18, 420, 320, 364

[56] References Cited

U.S. PATENT DOCUMENTS

| 3,442,535 | 5/1969 | Frohlich | 285/320 X |
| 3,558,161 | 1/1971 | Bormioli | 285/320 X |
| 3,586,350 | 6/1971 | Ashton | 285/320 X |
| 3,661,408 | 5/1972 | Gibbons | 285/18 |
| 3,865,409 | 2/1975 | Paddington | 285/18 |

Primary Examiner—Werner H. Schroeder
Assistant Examiner—C. J. Arbes
Attorney, Agent, or Firm—Christie, Parker & Hale

[57] ABSTRACT

A quick disconnect coupler in which a plurality of jaw clamping units are supported around the periphery of a pipe section for clamping the flange of a second pipe section in engagement with the first pipe section. Each hydraulic unit includes a support member secured to the outer periphery of the pipe and a frame member slidably supported on the support member for sliding movement parallel to the axis of the pipe. An overcenter toggle linkage connects a jaw member to the frame member. A rotatable cam pivotally secured to the frame member engages a stop on the support member. One end of a hydraulic actuator is connected to the cam for rotating the cam while the other end is connected to the toggle linkage for moving the jaw. The actuator causes the toggle linkage to move the jaw into clamping engagement with the flange of the second pipe, while the other end of the hydraulic actuator rotates the cam whem the toggle linkage reaches the overcenter locked position. The cam slides the frame member in an axial direction to adjust for variations in the thickness of the flange being clamped by the jaw.

12 Claims, 3 Drawing Figures

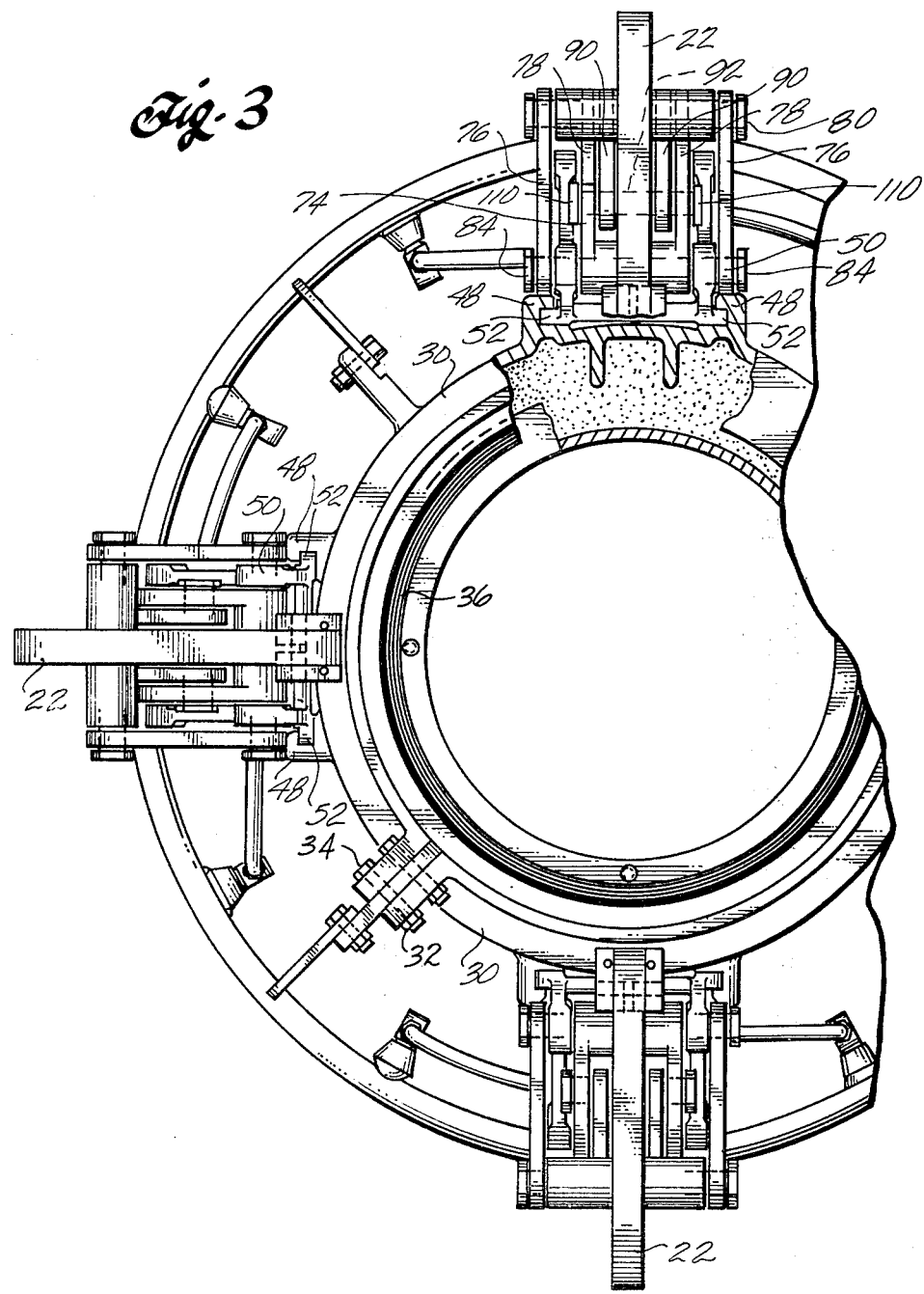

ial alignment with the pipe section 10. The jaws 22 are formed with a notch 25 formed by facing material 27 for engaging both the outer perimeter and back surface of the flange 24. The hydraulic clamping units individually move the associated jaws between a clamping position, as shown in FIG. 1, and an open position, as shown in FIG. 2. The

QUICK DISCONNECT COUPLER

FIELD OF THE INVENTION

This invention relates to quick disconnect pipe couplers and more particularly to a quick disconnect coupler for locking a marine loading arm to a tanker vessel.

BACKGROUND OF THE INVENTION

In loading or unloading crude oil, liquified natural gas, or other liquified petroleum products, chemicals or the like, between a tanker vessel and shore installations, it is common practice to use special loading arms by which a segmented pipe connection to the shore installation can be maneuvered into position to connect to pipes on the vessel communicating with the tanks. Generally the moving end of the segmented pipe supported by the loading arm is provided with a coupling device which allows the coupler to attach itself to the flanged end of the pipe on the vessel in a manner to form a fluid-tight joint. Preferably this coupler is hydraulically or electrically operated from a remote location. Since the floating vessel may be moving during the coupling operation, or because the coupler must be easily disconnected in an emergency, a quick disconnect coupling system is highly desirable. A number of such couplers have been developed in the prior art, such as shown, for example, in U.S. Pat. Nos. 3,558,161, and 3,865,409. Such couplings typically involve a plurality of clamping assemblies having jaws which are movable in and out of engagement with the flanged end of the pipe on the vessel. These clamping devices are operated by various combinations of linkages and hydraulic actuators which move the jaws in and out of clamping position.

One problem in providing quick disconnect couplers of the type described is that the standard flanged pipe is usually only machined on the end face and the outer edge. The back surface of the flange is generally not machined and therefore the thickness of the flange may vary considerably from pipe to pipe, and in fact the thickness of the flange may vary from point to point on a single flange. The clamping jaws cannot readily accommodate such variations in thickness of the flange. Accordingly it has been the practice to provide an adaptor which is secured to the pipe flange which is machined to close tolerances. The jaws of the coupler then engage the adaptor in clamping the coupler in place on the end of the pipe. However, the use of adaptors is undesirable for a number of reasons, such as the fact they are time consuming to install, they become damaged, lost, or misplaced, and they are a source of added expense. Various coupling designs have been proposed which provide individual adjustment of the jaws to accommodate variations in the thickness of the flange. For example, the jaws have been operated through spring linkage which allows the linkage to yield to variations in the position of the jaws when in the clamping position. Applying clamping pressure through springs, however, may result in insufficient clamping pressure resulting in poor sealing at the coupler. Cam-operated mechanisms have been proposed which provide positive clamping action. However, such systems have involved complex camming arrangements to get a combined radial movement for initially positioning the jaws and axial movement to apply clamping pressure against the back side of the flange.

SUMMARY OF THE INVENTION

The present invention is directed to an improved clamping mechanism for a quick disconnect coupler which is self-adjusting and provides a combined axial and radial movement of the clamping jaws. Thus the jaws provide a self-centering action in bringing the coupler and pipe into alignment for clamping them in a sealed connection. The clamping unit is hydraulically operated but does not rely on hydraulic pressure to maintain the jaws in the clamped position once the jaws are set. An overcenter toggle linkage provides a positive clamping action.

In brief, the present invention provides a quick disconnect coupler for connecting the flanged end of a pipe to a second pipe by means of a plurality of jaw actuator units. Each jaw actuator unit includes a support member anchored to one of the pipes. A frame member is movably supported on the support member for movement in a direction parallel to the axis of the pipe. A clamping jaw is movably supported from the frame member by a pair of linkage arms of different length. A pair of toggle arms are pivotally connected to each other and respectively to the frame member and to the jaw. An hydraulic actuator has one end connected to the pivotal connection between the two toggle arms. The other end of the hydraulic actuator is connected to a cam which is rotatably supported on the frame member. The cam has a cam surface in contact with a stop secured to the support member. The hydraulic actuator operates both the toggle linkage and rotates the cam to set the jaw in clamping position and to move the supporting frame axially to adjust for variations in thickness of the pipe flange.

DESCRIPTION OF THE DRAWINGS

For a better understanding of the invention reference should be made to the accompanying drawings, wherein:

FIG. 3 is a partial end view of the coupler assembly.

DETAILED DESCRIPTION

Figure 1:
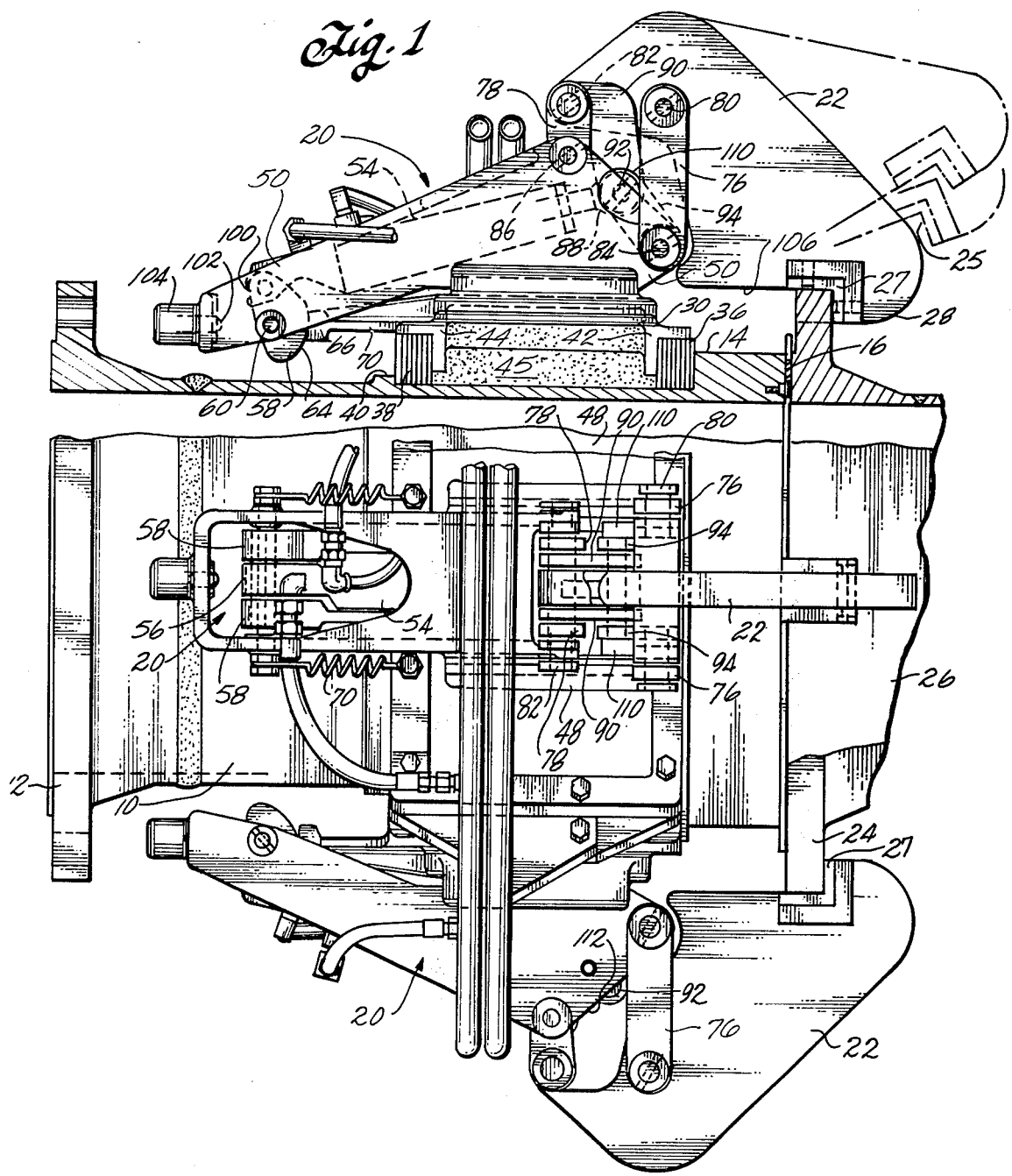
FIG. 1 is a side view partly in section of the coupler mechanism in the closed or clamping position.

Referring to the drawings in detail, the coupler assembly includes a section of pipe indicated generally at 10 which terminates at one end in a flange 12 by which the pipe section is mounted on the end of a standard pipe. The other end of the pipe section 10 is machined with lip 14 forming an end surface to which is attached a sealing gasket 16.

Figure 2:
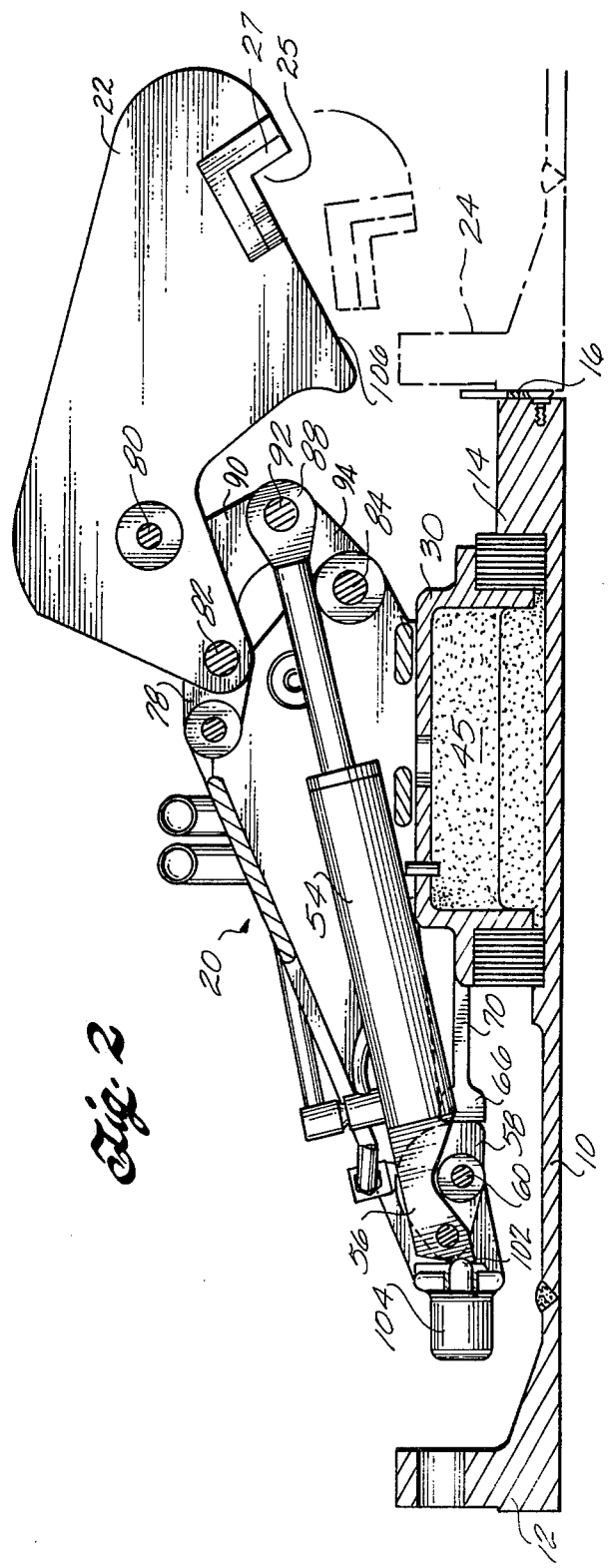
FIG. 2 is a partial side view in section showing the clamping mechanism in the open position.

The quick disconnect coupler assembly includes a plurality of hydraulically operated clamping units, as indicated at 20, which are spaced circumferentially around the outer perimeter of the pipe section 10. Each of the clamping units, as hereinafter described in detail, operates a clamping jaw 22 which is designed to engage the flange 24 on the end of a standard pipe section 26 and clamp the face of the flange 24 against the sealing gasket 16 with the pipe 26 in axial alignment with the pipe section 10. The jaws 22 are formed with a notch 25 formed by facing material 27 for engaging both the outer perimeter and back surface of the flange 24. The hydraulic clamping units individually move the associated jaws between a clamping position, as shown in FIG. 1, and an open position, as shown in FIG. 2. The motion of the jaws is along an arc, indicated at 28, which is substantially perpendicular to the face of the flange at the clamping position and curves out and away from the flange in the open position, thus providing a substantially axial path of movement at the clamping position and a substantially radial movement as it approaches the open position.

Each clamping unit 20 is movably mounted on the pipe section 10 by a support member 30 which is in the form of a split collar, the two sections of the split collar being bolted together as indicated at 32 and 34. The split collar is thermally insulated from the pipe section by a pair of retaining rings 36 and 38 made of suitable thermal insulated plastic material. The retaining ring 36 engages the back of the lip 14 while the retaining ring 38 engages a shoulder 40 extending around the outside of the pipe section 10. The support member 30 is formed with peripheral flanges 42 and 44 which clamp the retaining rings in place. The space between the pipe section and the support member 30 is then preferably filled with a polyfoam insulating material 45 to isolate the supporting member 30 thermally from the pipe section 10 through which cryogenic liquids may be flowing.

The support member 30 has four pairs of grooved tracks, as indicated at 48, the tracks extending in a direction parallel to the axis of the pipe section. Each clamping unit includes a frame member, indicated generally at 50, having guides 52 which slidably engage the grooved tracks 48, thus allowing the clamping unit to be secured to the pipe section while allowing the clamping unit to be constrained to movement relative to the pipe section in a direction parallel to the axis of the pipe section.

Motion of the clamping unit 20 relative to the support member 30 is controlled by an hydraulic actuator 54. One end of the hydraulic actuator 54 terminates in a mounting arm 56. The mounting arm is pivotally connected to a pair of cams 58 which are rotatably supported on the frame member 50 by a shaft 60. The cams 58 have cam surfaces 64 which engage a pair of stops 66 projecting from the support member 30. The cams 64, as viewed in FIG. 1, are shaped such that clockwise rotation of the cams about the shaft 60 causes the distance between the axis of the shaft 60 and the stops 66 to increase, thereby forcing the clamping unit to shift to the left, as viewed in FIG. 1. The cams 58 may be held against the stops 66 by tension springs 70 secured at one end to the outer ends of the shaft 60 and at the other end to the support member 30.

The other end of the hydraulic actuator 54 is connected to an overcenter toggle linkage for moving the clamping jaw 22. The clamping jaw 22 is hinged to the frame member 50 by two pair of linkage arms 76 and 78. The linkage arms 76 are substantially longer than the linkage arms 78. When the clamping jaw 22 is in the clamped position shown in FIG. 1, the linkage arms 76 and 78 are substantially parallel and extend radially away from the axis of the pipe section. The linkage arms 76 and 78 are joined to the clamping jaw by hinge pins 80 and 82, respectively, which lie along a line extending substantially parallel to the axis of the pipe section when the jaw is in the clamping position. The other ends of the linkage arms 76 and 78 are connected to the frame member 50 by hinge pins 84 and 86, respectively.

In moving from the clamping position to the open position, the linkage arms 76 rotate about the hinge pin 84 and the linkage arms 78 rotate around the hinge pin 86. Since the arc through which the hinge pin 82 moves has a much shorter radius than the arc through which the hinge pin 80 is moved, rotation of the linkage arms 76 and 78 causes the notched end of the jaw to move initially laterally and then radially outwardly, in the manner shown in the drawings.

The jaw is moved between the clamping and open positions by the hydraulic actuator 54. To this end, the end of the hydraulic actuator is connected to the jaw by a pair of toggle arms 90 which are journaled at one end on the hinge pin 82 and journaled at the other end on a hinge pin 92 to which the end 88 of the actuator is connected. The end 88 of the actuator is also linked to the frame member 50 by a pair of toggle arms 94 which are hinged at one end on the hinge pin 84 and at the other end on the hinge pin 92.

In operation, if the length of the hydraulic actuator is expanded by admitting fluid under pressure to one end, it operates to open the jaw by causing the toggle linkage arms 94 to rotate about the hinge pin 84. This causes the toggle arms 90 to move the hinge pin 82 in a clockwise arc about the hinge pin 86, thereby causing the jaw to move from the clamped position to the open position. Because the hydraulic actuator is floating, that is, both ends are movable relative to the frame member 50, expansion of the hydraulic actuator also operates to rotate the cams 58 in a counterclockwise direction around the hinge pin or shaft 60. The cams are thus rotated by the expansion of the actuator 54 until the mounting arm 56 of the actuator moves to a detent position. In the detent position, a notch 100 in the end of the support arm 56 of the actuator engages a detent ball 102 which is part of a detent assembly 104 mounted on the frame member 50. The detent assembly 104 includes a compression spring which urges the detent ball 102 outwardly into engaging position with the notch 100.

With the jaws open and the cams in the detent position in which the clamping units are positioned in their most right-hand position, as viewed in FIG. 1, pipe coupling action is initiated by maneuvering the pipe section 10 into engagement with the flange 24. The open jaws 22, by means of guide surfaces 106, help to center the pipe section 10 in alignment with the flanged pipe 26. The hydraulic actuator 54 is then caused to retract, moving the end 88 of the actuator 54 to the left. The support arm 56 and associated cams 58 are held in detent position by engagement of the ball 102 in the notch 100. As a result, the jaws move radially inwardly into engagement with the back of the flange 24, the guide surfaces 106 acting to center and align the axis of the pipe section 10 with the pipe section 26. When the jaws are fully retracted into the clamping position, the pins 82, 84, and 92 are substantially aligned, with the pin 92 moving slightly past the centerline between the axis of the pins 82 and 84. In this position the toggle locks the jaw in the clamping position and the jaw cannot be opened unless the pin 92 is moved back over center by the hydraulic actuator 54. Once the toggle linkage is moved over center, further movement relative to the frame 50 is prevented by stops 110 on each end of the toggle pin 92 which come into engagement with the frame member at 112. Once the stops 110 engage the frame member 50, further retraction of the actuator 54 causes the cams 58 to rotate clockwise about the hinge pin 60. As a result the cam action against the stop 66 forces the frame member to the left, as viewed in FIG. 1, thereby moving the jaws axially into clamping engagement with the flange 24. Once in clamping position the hydraulic pressure in the actuator will build rapidly.

This pressure can be sensed to stop additional flow of fluid to the actuator when a predetermined pressure level is reached. Even if the fluid pressure is then reduced to zero, full clamping pressure is retained at the jaws since over center toggle action and the rotation of the cams can only be overcome by a positive extension of the hydraulic actuator 54.

What is claimed is:

1. A quick disconnect coupler for connecting the flanged end of one pipe to a second pipe, the coupler comprising a plurality of jaw actuator units secured to the outside of the second pipe in circumferentially spaced positions, each unit including a support member anchored to a second pipe, a frame member movably supported on the support member for movement in a direction parallel to the axis of the pipe, a clamping jaw, two pair of linkage arms of different length pivotally connecting the jaw to the frame member, a pair of toggle arms pivotally connected to each other and respectively to the frame member and to the jaw, a linear actuator, one end of which is pivotally connected to the two toggle arms, and adjustable means connecting the other end of the actuator to the frame member and to the support member for moving the frame member relative to the support member when the actuator drives the toggle linkage.

2. Apparatus of claim 1 wherein the adjustable means includes a cam rotatably supported on the frame member, means pivotally connecting the other end of the actuator to the cam for rotating the cam, the cam engaging a portion of the support member for moving the frame member relative to the support member as the cam rotates.

3. Apparatus of claim 2 further including detent means mounted in the frame member and engaging the cam for holding the cam in a fixed angular position unitl the torque on the cam by the actuator exceeds a predetermined level sufficient to release the detent means.

4. Apparatus of claim 3 wherein rotation of the cam by the actuator away from the detent position moves the frame member in a direction away from the flanged end of said one pipe.

5. Apparatus of claim 1 wherein each of said jaws includes an elongated guide surface extending parallel to the axis of the second pipe when the jaws are in the closed position for radially aligning the axes of the two pipe sections as the jaws are moved to the closed position.

6. Apparatus of claim 3 wherein the actuator is a linear hydraulic actuator.

7. A jaw assembly for a quick disconnect pipe coupler for clamping the ends of two pipe sections together, comprising a support member adapted to be secured to the outside of a pipe section, a frame member, guide means movably securing the frame member to the support member, the guide means guiding the motion of the frame member in a linear path parallel to the axis of the pipe sections, a jaw member, means movably supporting the jaw member on the frame member, the frame member, jaw member, and means supporting the jaw member being movable axially as a unit on the support member, and drive means carried by the frame member and linking the jaw member to the support member, the drive means when energized moving the jaw relative to the frame member and the frame member relative to the support member.

8. Apparatus of claim 7 further including detent means for normally restraining the frame member in a predetermined position relative to the support member, the detent means including means releasing the frame member when the force exerted by the drive means against the restraining action of the detent means exceeds a predetermined level.

9. Apparatus of claim 8 wherein the drive means includes a rotatable cam mounted on the frame member and engaging the support member, rotation of the cam causing the frame member to move along said guide means relative to the support member, the detent means engaging the cam to normally restrain the cam at a predetermined angular position.

10. Apparatus of claim 9 wherein the drive means further includes an actuator device for applying a force between the jaw member and a point on the cam radially offset from the axis of rotation of the cam.

11. Apparatus of claim 10 wherein rotation of the cam by the actuator away from the detent position moves the frame member in a direction away from the flanged end of said one pipe.

12. Apparatus of claim 7 wherein said means normally securing the jaw member to the frame member includes over-center toggle linkage for locking the jaw in a closed position by moving the toggle linkage slightly over-center.

* * * * *